United States Patent
Omori et al.

(10) Patent No.: US 6,658,023 B1
(45) Date of Patent: Dec. 2, 2003

(54) IMAGE TRANSMISSION SYSTEM

(75) Inventors: Kazuyuki Omori, Kanagawa (JP); Hiroyuki Hatta, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/406,029

(22) Filed: Sep. 27, 1999

(30) Foreign Application Priority Data

Jan. 18, 1999 (JP) .................................... 11-009646

(51) Int. Cl.[7] .............................. H04J 3/16; H04J 3/22
(52) U.S. Cl. ..................... 370/468; 370/477; 370/464
(58) Field of Search .......................... 370/395, 395.1, 370/395.2, 392.21, 395.4, 395.41, 395.6, 395.64, 464, 474, 468, 477; 348/408.1, 403.1; 375/240.1, 240.8; 382/248

(56) References Cited

U.S. PATENT DOCUMENTS

| | | | | |
|---|---|---|---|---|
| 5,805,933 A | * | 9/1998 | Takahashi | 710/72 |
| 5,880,777 A | * | 3/1999 | Savoye et al. | 348/217.1 |
| 6,011,901 A | * | 1/2000 | Kirsten | 386/123 |
| 6,181,711 B1 | * | 1/2001 | Zhang et al. | 370/468 |
| 6,181,823 B1 | * | 1/2001 | Takahashi | 382/232 |
| 6,385,177 B1 | * | 5/2002 | Suda et al. | 370/310 |
| 6,385,352 B1 | * | 5/2002 | Roustaei | 382/324 |

FOREIGN PATENT DOCUMENTS

| JP | 10028126 |   | 1/1998 |   |
|---|---|---|---|---|
| JP | 10028126 A | * | 1/1998 | ........... H04L/12/28 |

* cited by examiner

Primary Examiner—Wellington Chin
Assistant Examiner—Jamal A. Fox
(74) Attorney, Agent, or Firm—Katten Muchin Zavis Roseman

(57) ABSTRACT

An image transmission system in which when each of a plurality of image signals is transformed into compressed image data compressed at an image compressing portion, the image data are assembled to cells at a cell assembly portion, and the cells from the cell assembly portion are switched at a switching portion, a band controller controls the cell assembly portion so that a band of a transmission line has a value lower than a total band required for a simultaneous transmission of each of the image data. Also, a network controller for controlling band controllers or compression rate controllers at each of communication nodes on a network is provided. Moreover, a sensor which detects a change of an event to control the band controller or the compression rate controller is provided.

12 Claims, 10 Drawing Sheets

$\beta < \alpha$ (D1~D30 RESPECTIVELY CORRESPOND TO IMAGE DATA OF CAMERAS 10_1~10_30)

(D1~D30 RESPECTIVELY CORRESPOND TO IMAGE DATA OF CAMERAS 10_1~10_30)

IMAGE TRANSMISSION SYSTEM

BACKGROUND OF THE INVENTION

1. Field of the Invention

The present invention relates to an image transmission system, and in particular to an image transmission system which digitizes a plurality of image signals for the transmission.

In order to prevent occurrences of natural disasters such as floods, cliff crumbles, and mud flows or to quickly understand the situation after the occurrence of such disasters, it has been required to provide an image transmission system having monitoring cameras set at a plurality of monitoring points over dams, rivers, check dams, or the like from which picture signals are transmitted through communication lines as image data to be collected at such places as remote monitoring centers.

2. Description of the Related Art

The prior art of such image transmission system is shown in FIGS. 9 and 10.

FIG. 9 shows an analog image transmission system which transmits picture signals by 1:1 in the form of analog signals by using transmission medium such as optical fiber cables. The picture signals of cameras 10_1–10_3 are transmitted in the form of analog signals from one analog image transmitter to another, i.e. from 90_1 to 91_1, from 90_2 to 91_2, and from 90_3 to 91_3, respectively. The picture signals outputted from the analog image transmitters 91_1–91_3 are transmitted to an image switch 800 where they are properly selected by switching to be projected on a monitoring device 900.

In contrast to such an analog image transmission system, there is an image transmission system which digitizes picture signals to perform a multiplex transmission using the ATM method. FIG. 10 shows an example of such system.

The picture signals of the cameras 10_1–10_3 are transformed into digital signals i.e. image data and further compressed by image compressing portions 20_1–20_3, respectively to be transmitted to a cell assembly portion (CLAD) 30 for assembling the image data to cells. The cell assembly portion 30 transmits the cells to an ATM switching portion 40. The ATM switching portion 40 transmits the cells to a transmission line 600 by a time division multiplexing method and the like.

Such a digital image transmission system can flexibly deal with communications including a low speed communication, a communication with less information, and a high speed communication of a wide band, since a higher speed processing is possible and the number of transmission cells can be varied according to the quantity of generated information.

In order to perform a more detailed monitoring operation using such image transmission system, it is desirable to increase the number of monitoring points for collecting many monitoring pictures.

However, since the digital image transmission system of the prior art transmits all of the image data continuously regardless of the characters of the data, a band β of the transmission line 600 through which plural image data are simultaneously transmitted requires a total α of those image data band or more.

Namely, provided the bands of each transmission line through which the compressed data from the cameras 10_1–10_3 are transmitted are a, b, and c, respectively in FIG. 10 and compared with their total α (=a+b+c), the band β of the transmission line 600 requires to be greater than or equal to α (β≧α). Therefore, it leads to the increase of the transmission band and the expansion of the communication equipment.

Also, when transmitting plural image data through the same transmission line, since the band of each of the image data is preset and this preset band is always occupied fixedly, not only the transmission band increases but also there is a possibility of transmitting information which is not necessarily required.

Moreover, being fixed to a preset value, the compression rate of the image data cannot be adjusted to an appropriate transmission rate or transmission quality (image quality) depending on situations.

For example, in case of river monitoring, since the water level of the river does not rise rapidly in a short time unless there is an influence by a downpour and such, image transmissions at a relatively low rate (low quality) may be allowed in a normal condition. The monitoring precision may be raised by being switched over to the image transmission at a high rate (high quality) after the forecast or beginning of rainfall.

However, since the above-mentioned prior art has a fixed compression rate, if the preset rate is low, a necessary monitoring precision cannot be achieved when there is a change of an event or a possibility of a change. On the contrary, if the preset rate is high, more information than required are to be transmitted in a normal condition, resulting in an inefficient use of the transmission band.

SUMMARY OF THE INVENTION

It is accordingly an object of the present invention to provide an image transmission system capable of efficiently utilizing the transmission band and maintaining an appropriate quality of image.

[1] For the achievement of the above object, the image transmission system according to the present invention comprises an image compressing portion for digitizing each of a plurality of image signals and further transforming the same into compressed image data, a cell assembly portion for assembling the image data to cells, a switching portion for switching the cells from the cell assembly portion, and a band controller for controlling the cell assembly portion so that a band of a transmission line has a value lower than a total band required for a simultaneous transmission of each of the image data.

Namely, as schematically shown in FIG. 1, picture signals taken by cameras 10_1–10_3 are digitized at image compressing portions 20_1–20_3 and transmitted as compressed image data to a cell assembly portion 30. The cell assembly portion 30 transmits image data cells to a cell switching portion 40 under the control of a band controller 100.

At this time, the band controller 100 can arbitrarily set a control condition in order for the total of plural image data cells not to exceed an available band in the transmission line.

Thus, appropriately setting the control condition of the band controller 100 enables the band β of the transmission line 600 to be maintained at a lower value than the total a of the bands required for transmitting each of th image data.

[2] Also, in the above present invention [1], the band controller may divide the image signals into groups and control the cell assembly portion in a time division manner for at least one of the groups.

Namely, the band controller may divide the plural image signals into, for example, a group requiring a continuous transmission and at least one group capable of an intermittent transmission, and control the cell assembly portion in a time division manner for the group capable of the intermittent transmission.

[3] Also, in the above present invention [1], a network controller for controlling the band controller through a network may be provided.

Namely, if the system is provided in a network of a ring type and such in which a plurality of communication nodes sharing a communication line, a network controller may be provided for generally controlling the band controller at each communication node. Controlling the band as mentioned above enables supervising the band application status in the entire network.

[4] Also, in the above present invention [1], a sensor for detecting a change of an event to control the band controller may be provided.

Namely, providing a sensor such as a motion sensor or a water level sensor which detects a change of an event enables the sensor to control the band controller based on the change of the event. The band controller performs the band control as mentioned above.

Thus, performing the band control of the transmission line having the change of the event as a trigger enables the band of the transmission line to be used in accordance with the real-time changes of the situations.

[5] Also, in the above present invention [1], the band controller may control a compression rate of the image compressing portion.

In the above present invention [1], the band controller controls the band by controlling the cell assembly portion to control the amount of cells flowing in the switching portion from the cell assembly portion.

By contrast, in the present invention [5], the band controller controls the amount of cells flowing in the cell assembly portion from the image compressing portion by controlling the compression rate of the image compressing portion. Namely, the band controller can control the band of the transmission line by controlling the compression rate of the image compressing portion, instead of the band control.

[6] Also, the image transmission system according to the present invention may comprise an image compressing portion for digitizing each of a plurality of image signals and further transforming the same into compressed image data, a cell assembly portion for assembling the image data to cells, a switching portion for switching the cells from the cell assembly portion, and a compression rate controller for controlling a compression rate of the image compressing portion so that a band of a transmission line has a value lower than a total band required for a simultaneous transmission! of each of the image data.

Namely, in the present invention, the compression rate controller directly controls the image compressing portions 20_1–20_3 shown in FIG. 1, instead of the band control at the cell assembly portion. The amount of cells coming into the cell assembly portions from the image compressing portions can be controlled by controlling the compression rates of the image compressing portions. Namely, the compression rate controller can perform the band control among a plurality of image signals by controlling the compression rates of the image compressing portions.

[7] Also, in the above present invention [6], a network controller for controlling the compression rate controller through a network may be provided.

Namely, if the system is provided in a network of a ring type and such in which a plurality of communication nodes sharing a communication line, a network controller may be provided for generally controlling the compression rate controller at each communication node. Controlling the compression rate as mentioned above enables supervising the band application status in the entire network.

[8] Also, in the above present invention [6], a sensor for detecting a change of an event to control the compression rate controller may be provided.

Namely, providing a sensor such as a motion sensor or a water level sensor which detects a change of an event enables the sensor to control the compression rate controller based on the change of the event. The compression rate controller performs the compression rate control as mentioned above.

Thus, performing the compression rate control of the compression rate controller having the change of the event as a trigger enables the band of the transmission line to be used in accordance with the real-time changes of the situations.

[9], [10] Also, in the above present invention [3] or [7], the network controller may include control information in an overhead portion of an ATM cell which flows through the network.

Namely, the network controller provided in the network can include the control information in the overhead portion of the ATM cell which flows through the network.

[11], [12] Also, in the above present invention [3] or [7], the network controller may include control information in an payload portion of an ATM cell which flows through the network.

Namely, the network controller provided in the network may include the control information in the payload portion of the ATM cell which flows through the network.

BRIEF DESCRIPTION OF THE DRAWINGS

Throughout the figures, the same reference numerals indicate identical or corresponding portions.

DESCRIPTION OF THE EMBODIMENTS

Figure 1:
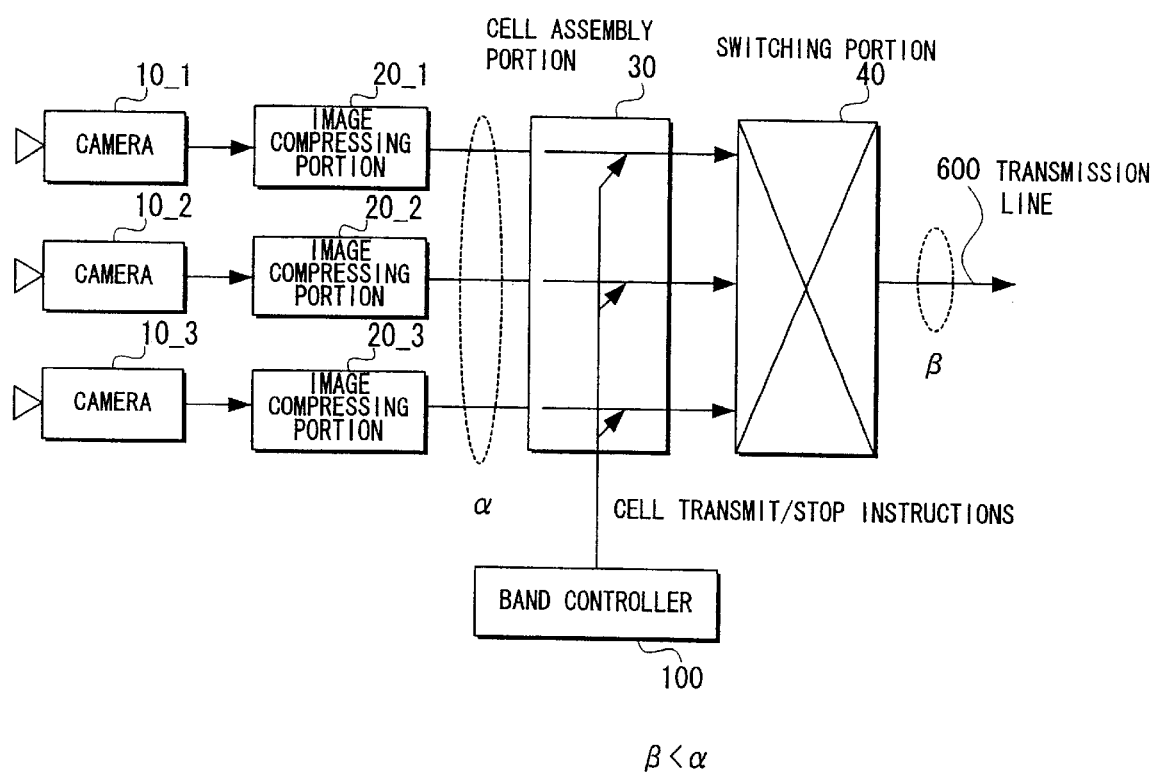
FIG. 1 is a block diagram illustrating a principle of an image transmission system according to the present invention.
Figure 2:
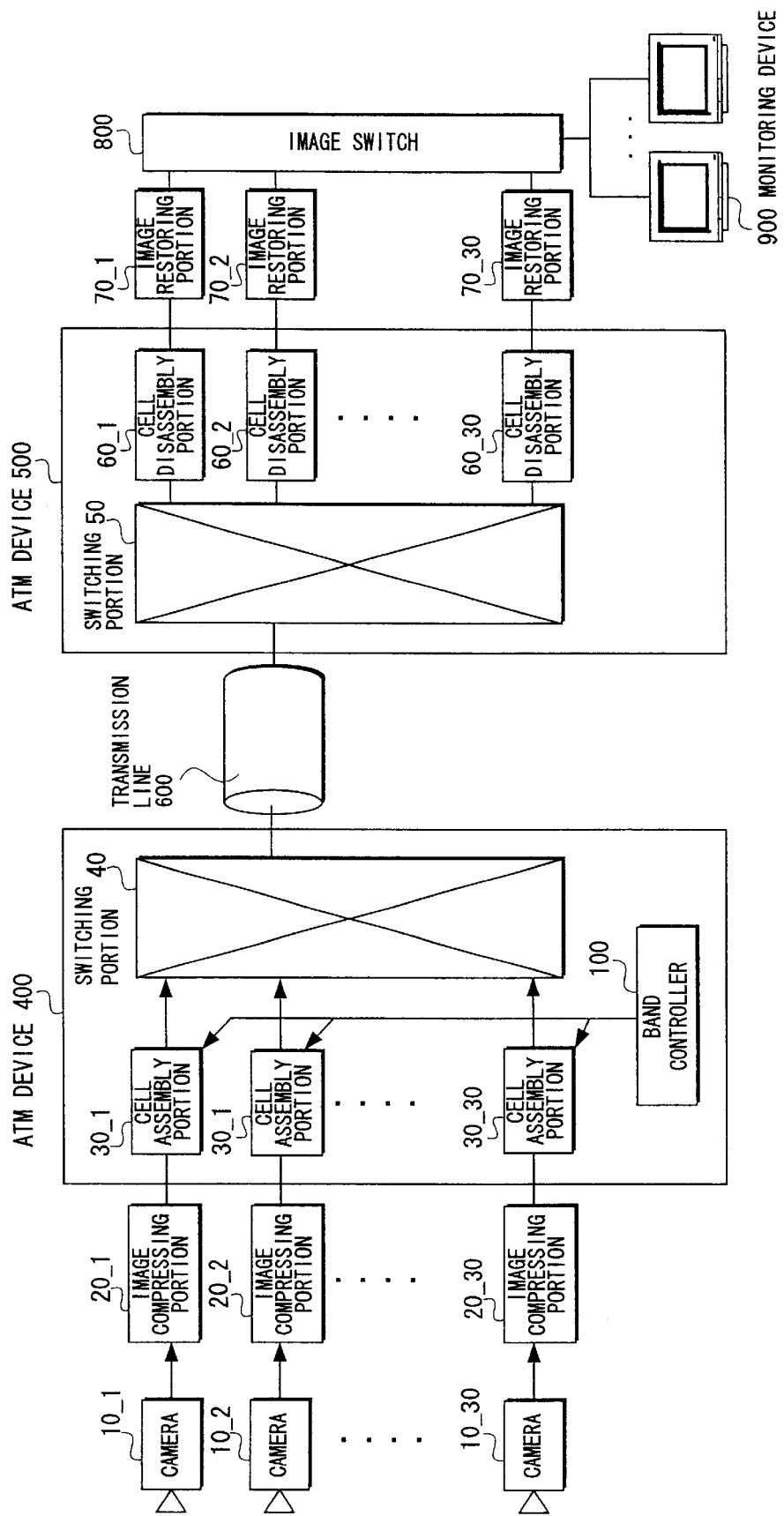
FIG. 2 is a block diagram illustrating an embodiment (1) of an image transmission system according to the present invention.

FIG. 2 shows an embodiment of the image transmission system according to the present invention when incorporated in a network. In this embodiment, image signals taken by thirty cameras 10_1–10_30 located on the side to be monitored are compressed in the form of image data by image compressing portions 20_1–20_30 respectively, and transmitted to an ATM device 400.

The ATM device 400 is composed of cell assembly portions 30_1–30_30, a switching portion 40, and a band controller 100. The band controller 100 controls the cell assembly portions 30_1–30_30 for a continuous transmission or an intermittent transmission (cell transmission/pause) based on a preset transmission control condition which will be described later.

In operation, the image signals are transmitted from the cameras 10_1–10_30 through the image compressing portions 20_1–20_30 and are converted into the data cells at the cell assembly portions 30_1–30_30, as mentioned above. These cells are then transferred from a switching portion 40 through a transmission line 600 to a switching portion 50 of an ATM device 500 on the monitoring side.

In the ATM device 500, each of cell disassembly portions 60_1–60_30 which has received the data cells from the switching portion 50 disassembles the data cells, which are transmitted to image restoring portions 70_1–70_30, respectively. The image data restored at the image restoring portions 70_1–70_30 are switched by an image switch 800 and projected on monitoring device 900.

Figure 3:
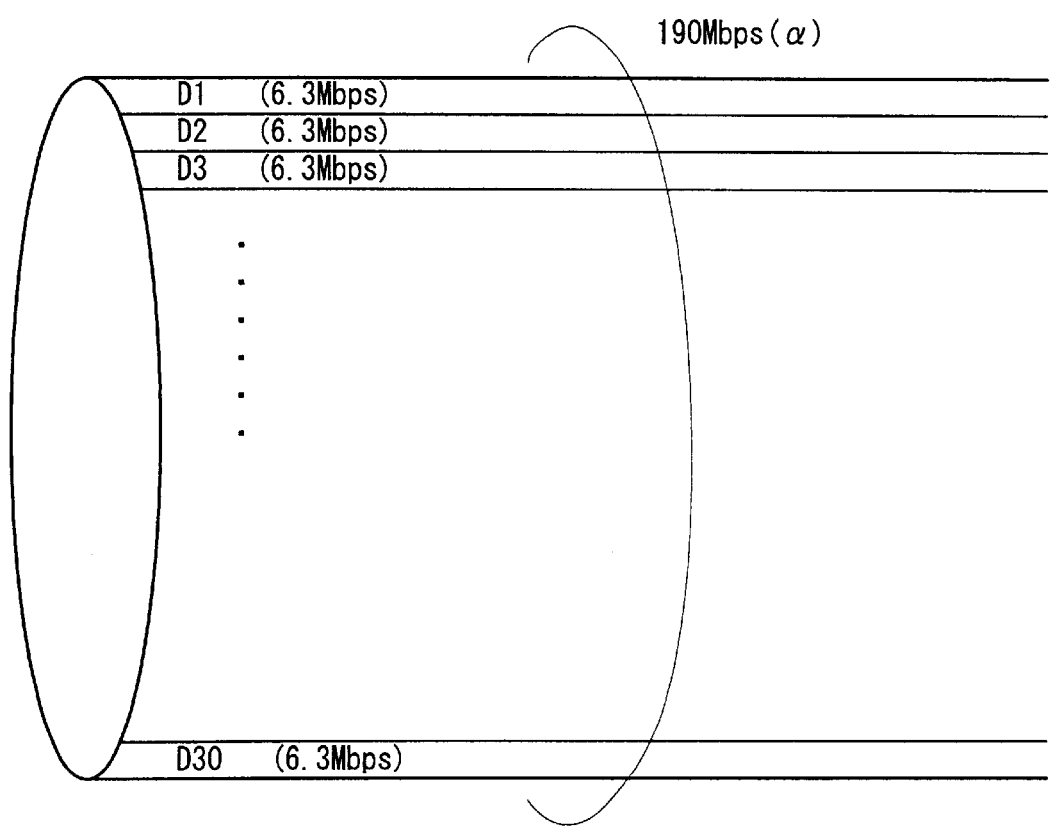
FIG. 3 is a diagram schematically illustrating a band application status during a continuous transmission.

It is to be noted that in order to continuously transmit the real-time image information of the above-mentioned thirty cameras on real time, supposing the transmission speeds after the image compression are e.g. 6.3 Mbps, the transmission line 600 requires a band of 190 Mbps or above (see FIG. 3, illustrating sub-bands D1–D30 each corresponding to a 6.3 Mbps sub-band for one of the above-mentioned thirty cameras).

Such a continuous transmission is effective for a system, such as a road condition monitoring system, which requires a real-time continuous monitoring as the traffic or the accident status changes momentarily.

However, if this system is applied to a system for monitoring the water level of a river for example, the data will be continuously transmitted regardless of little changes in the image information in a normal condition.

Therefore, setting a transmission time and/or a transmission pause time according to the requirement of the system enables the band of the transmission line to be utilized efficiently.

For example, the thirty cameras 10_1–10_30 shown in FIG. 2 can be divided into groups to set the transmission control conditions as follows:

Group A (cameras 10_1–10_10, sub-bands D1–D10): continuous transmission

Group B (cameras 10_11–10_20, sub-bands D11–D20): 10 second transmission/10 second pause Group C (cameras 10_21–10_30, sub-bands D21–D30) 10 second transmission, 20 second pause.

Figure 4:
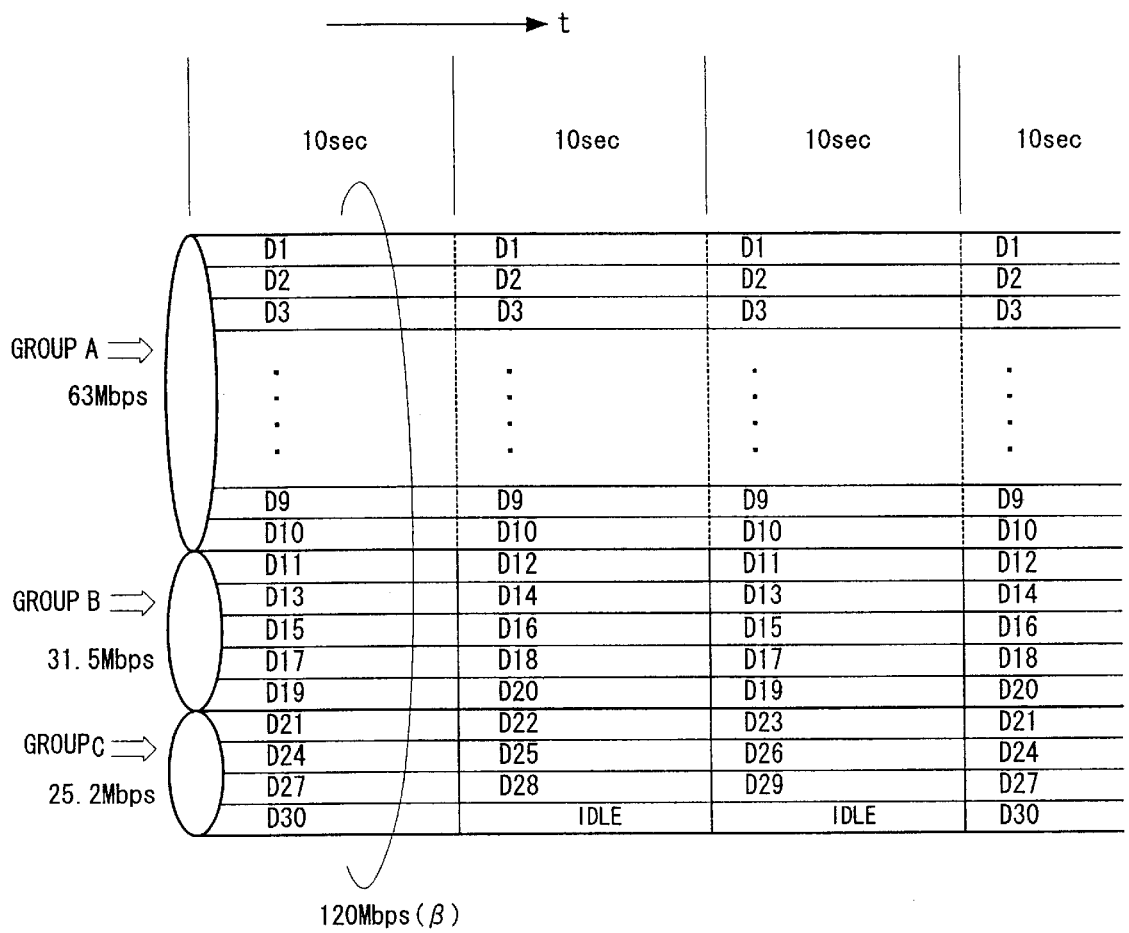
FIG. 4 is a diagram schematically illustrating a band application status when a transmission by band control is performed in an image transmission system according to the present invention.

FIG. 4 shows an image of the required band for the transmission line when the band controller 100 performs the control on such transmission control conditions. In this case, the group A for continuous transmission requires 63 Mbps. As for the group B, the data of, for example, cameras 10_11 and 10_12 are alternately transmitted every 10 seconds. Similarly as for the data of other cameras 10_13–10_20, the data of two cameras are transmitted alternately to share the band of 6.3 Mbps. Therefore, the required band for the entire group B is 31.5 Mbps.

As for the group C, for example, the cameras 10_21, 10_22, and 10_23 repeat the 10 second transmission/20 second pause in order. The cameras 10_24–10_29 similarly have the data of three cameras sharing the band of 6.3 Mbps. However, the camera 10_30 requires the band of 6.3 Mbps although there are periodical idle time bands of 20 seconds each where the data of the camera 10_30 are not transmitted since there is no sharing band with other cameras. Therefore, the required band for the entire group C is 25.2 Mbps.

Accordingly, if the above grouping is performed and the band controller 100 performs the above-mentioned control, the required band can be suppressed to 120 Mbps.

Figure 5:
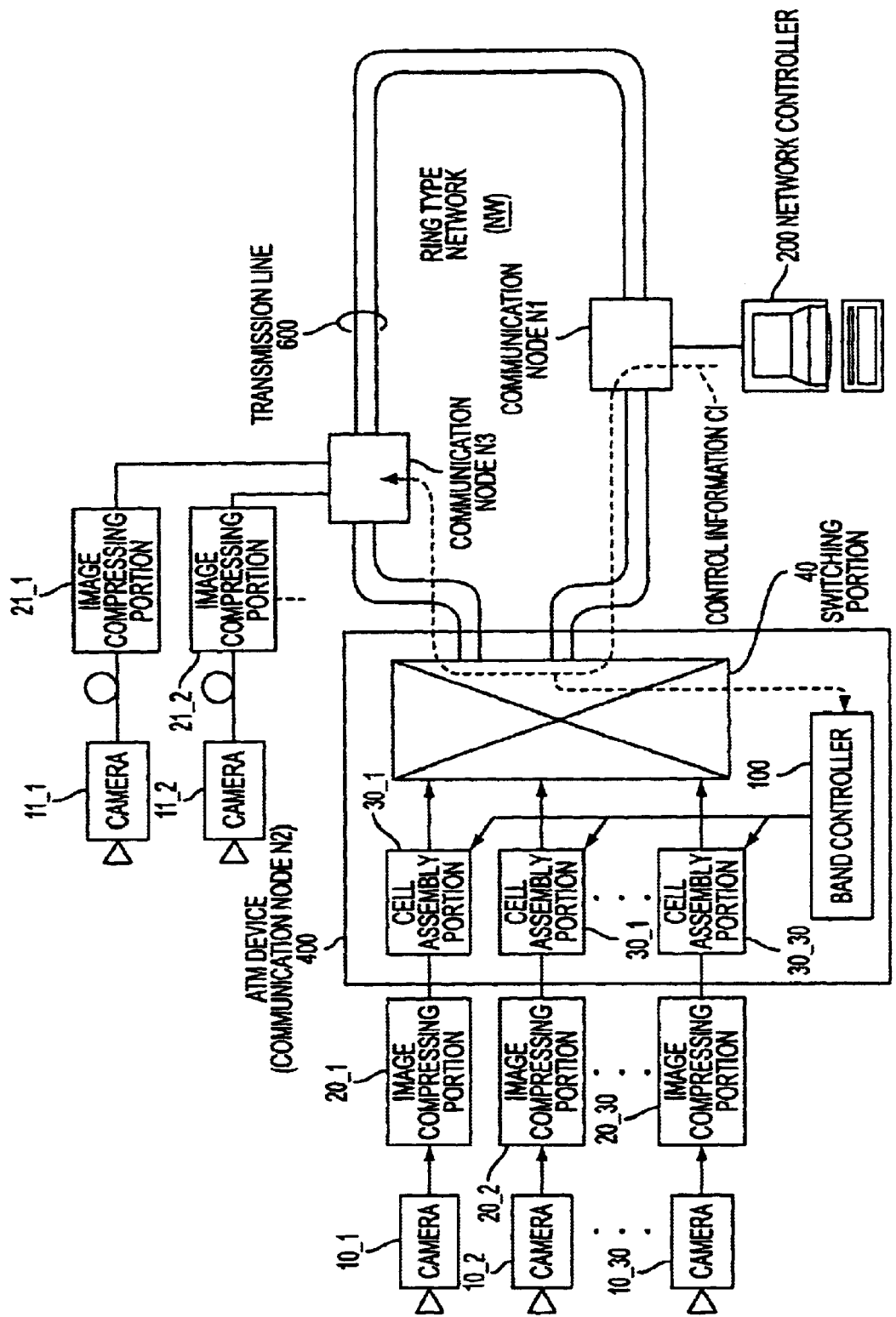
FIG. 5 is a block diagram illustrating an embodiment (2) of an image transmission system according to the present invention.

FIG. 5 shows an embodiment (2) of the image transmission system according to the present invention. In this embodiment, a network controller 200 for generally controlling the band controller is provided at a communication node N1 on the monitoring side. The band controller is provided in each of communication nodes N2 and N3. The communication nodes N1–N3 form a ring type network NW sharing the transmission line.

The arrangement of each of the communication nodes N2 and N3 is similar to that of the monitored side in FIG. 2. The band controller 100 controls the cell assembly portions 30_1–30_30 based on a control information CI from the network controller 200 in a similar way as the embodiment shown in FIG. 2.

Figure 6:
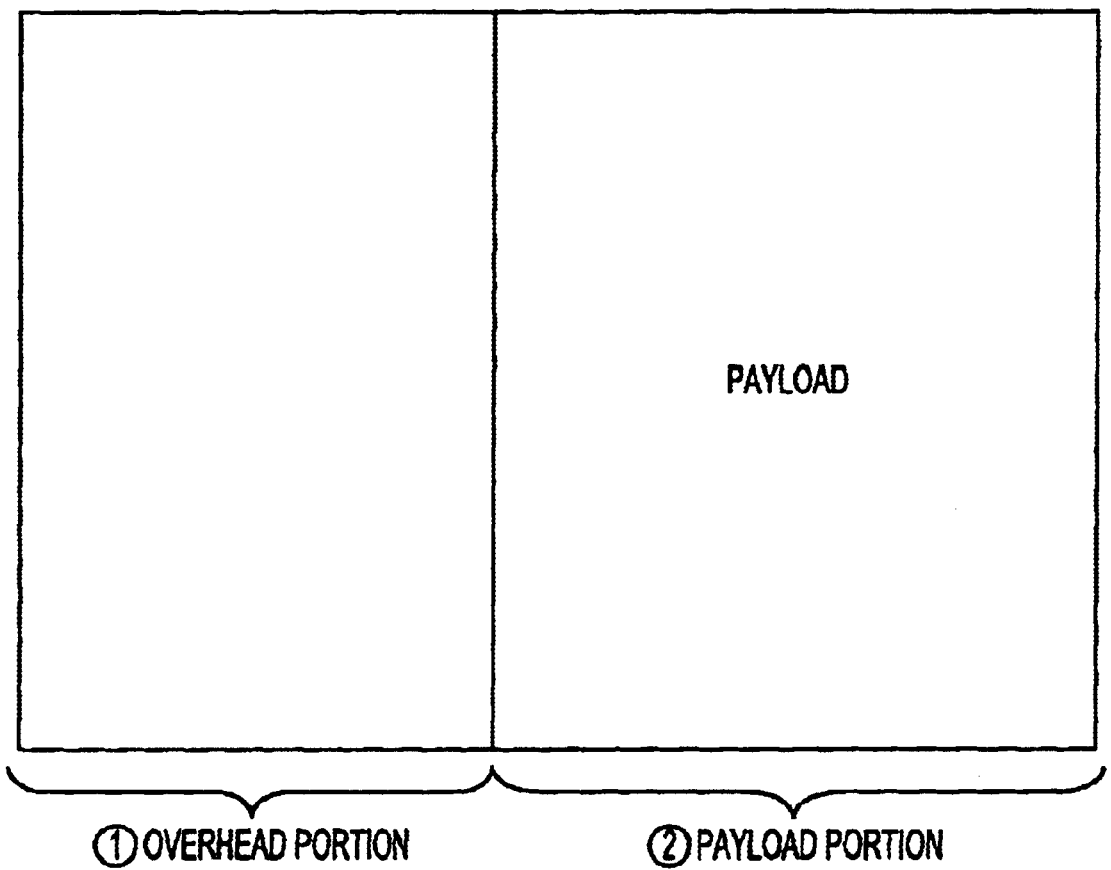
FIG. 6 is a diagram illustrating a general ATM cell format.

It is to be noted that the band control information CI which is transmitted by the network controller 200 can use an overhead portion (see ① in FIG. 6) or a payload portion (see ② in FIG. 6) which is a user information area of an ATM cell flowing through the network NW.

Figure 7:
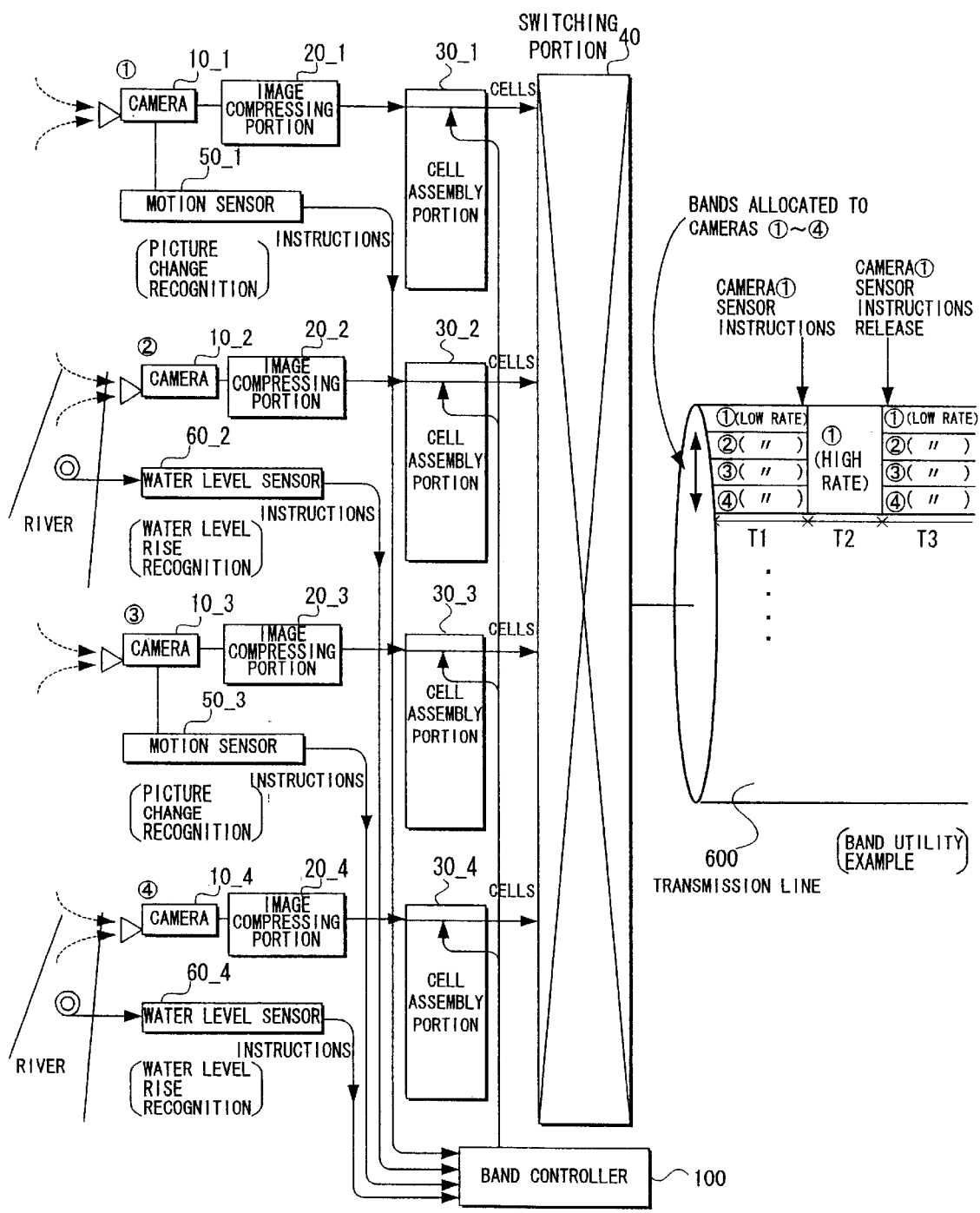
FIG. 7 is a block diagram illustrating an embodiment (3) of an image transmission system according to the present invention.

FIG. 7 shows an embodiment (3) of the image transmission system according to the present invention. Sensors for detecting changes of events to control the band controller are provided in this embodiment.

Namely, motion sensors 50_1 and 50_3 for recognizing picture changes are provided for cameras 10_1 and 10_3, respectively and water level sensors 60_2 and 60_4 for recognizing water level rises are provided for cameras 10_2 and 10_4, respectively. All of the sensors 50_1, 50_3, 60_2, and 60_4 transmit an instruction signal (detection signal) to the band controller 100 when changes of the object events are detected.

The band controller 100 controls the cell transmission/pause at the cell assembly portions 30_1–30_4 based on this instruction signal.

For example, supposing the picture signals of the cameras 10_1–10_4 in FIG. 7 are denoted as ①–④, respectively, the picture signals ①–④ are constantly transmitted at low rates as shown in the transmission line 600 in a normal condition, as indicated by a time period T1. If there is a change of the picture signal ① at this point, the motion sensor 50_1 transmits the instruction signal to the band controller 100. Based on this instruction signal, the band controller 100 controls to have only the cell assembly portion 30_1 transmit cells and the other cell assembly portions 30_2–30_4 pause the cell transmission so that the picture signal ① is transmitted at a high rate, as indicated by a time period T2.

This state continues until the picture signal ① is restored to the normal mode. When the picture signal ① is restored to the normal mode, the motion sensor 50_1 transmits an instruction signal for cancellation to the band controller 100. Based on this signal, the band controller 100 restores the control of the cell assembly portions 30_1–30_4 to the control condition of the normal condition. Therefore, the picture signals ①–④ are restored to the continuous transmission at low rates, as indicated by a time period T3.

Figure 8A:
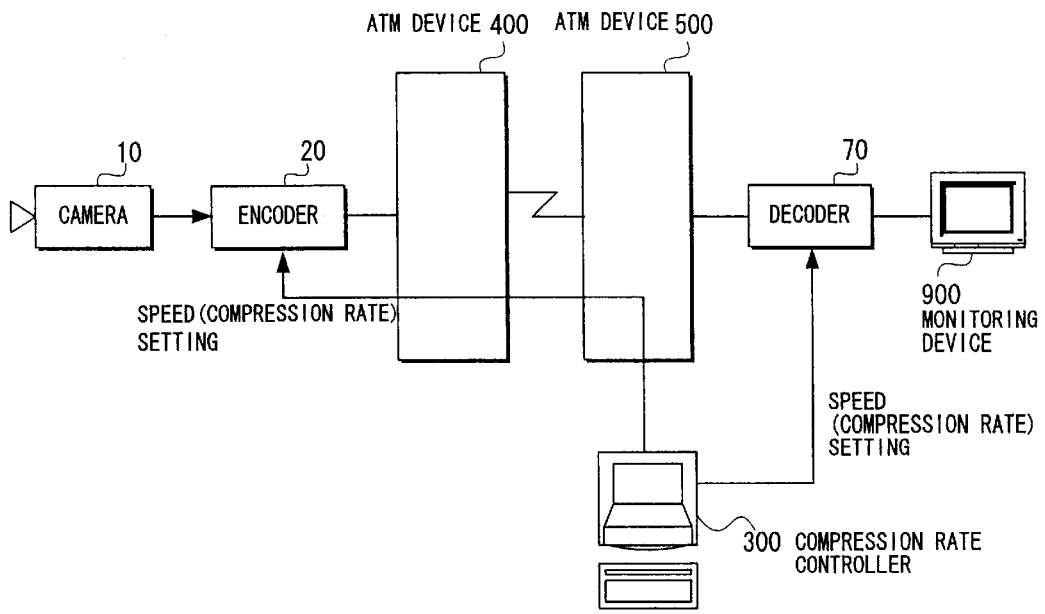
FIG. 8 is a block diagram illustrating an embodiment (4) of an image transmission system according to the present invention.
Figure 8B:
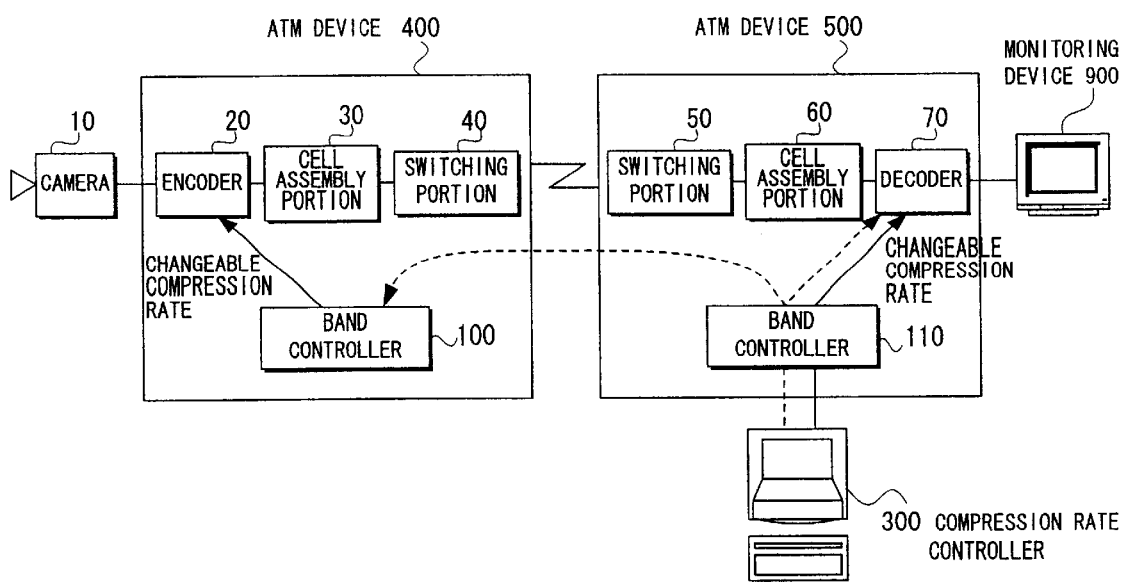
Figure 9:
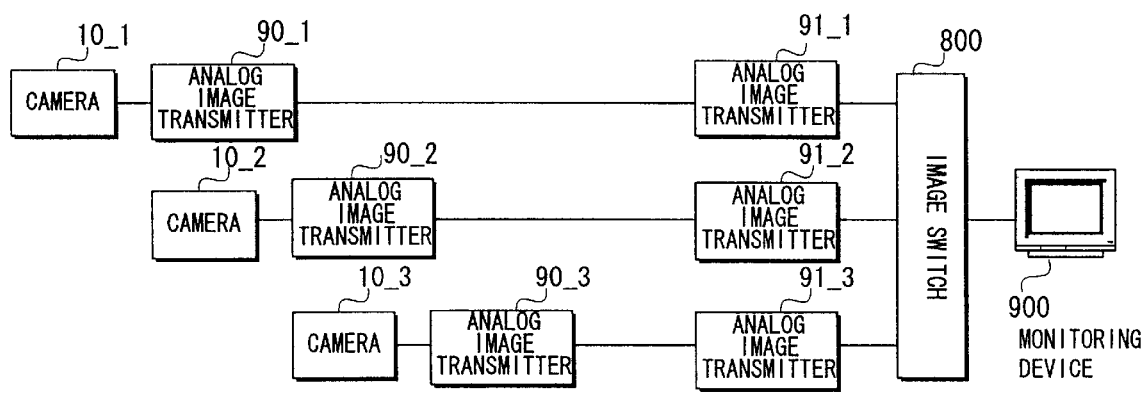
FIG. 9 is a block diagram illustrating a prior art image transmission system of an analog type.
Figure 10:
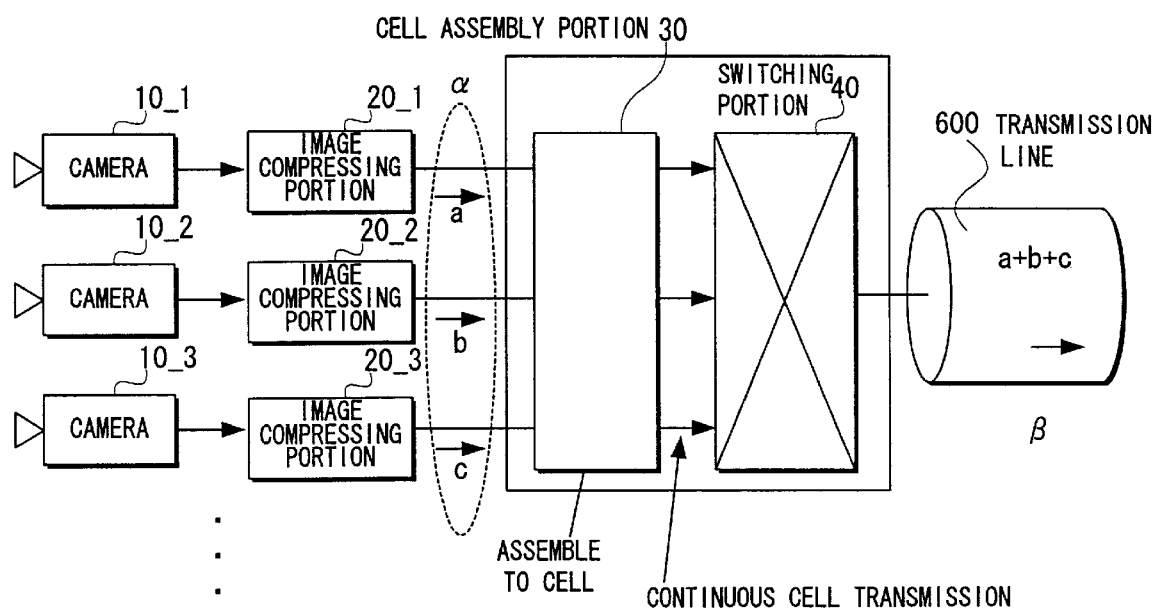
FIG. 10 is a block diagram illustrating a prior art image transmission system of a digital type.

FIGS. 8A and 8B show an embodiment (4) of the image transmission system according to the present invention. In this embodiment, a compression rate controller for controlling the compression rate of the image compressing portion is provided on the side of the monitoring device (monitoring side).

Considering the group B shown in FIG. 4, if the compression rate is changed so that each of the transmission rates may become 3.15 Mbps after the compression at each of the image compressing portions 20_11–20_20, even though image data of each of the cameras 10_11–10_20 in the group B is continuously transmitted, the band used on the transmission line 600 is 31.5 Mbps in total. Since the same effect can be achieved as the case where the band control is performed by the time division method, it is understood that the band control is also made possible by controlling the compression rate.

Also, when attempting to effectively use the band of the transmission line by changing the compression rate of the image compressing portion, the same compression rate is required to be set between an image compressing portion (encoder) 20 on the side of a camera 10 and an image restoring portion (decoder) 70 on the side of the monitoring device 900.

FIG. 8A shows a case where a compression rate controller 300 is provided as an independent device outside of the ATM devices 400 and 500, thereby directly controlling the image compressing portion 20 and the image restoring portion 70 independent of the band controllers (not shown) prescribed as functions within the ATM devices.

FIG. 8B shows a case where the image compressing portion 20 and the image restoring portion 70, band controllers 100 and 110 are built-in in the ATM devices 400 and 500, respectively in the form of boards. In this case, the band controllers 100 and 110 control the compression rates of the image compressing portion 20 and the image restoring portion 70, respectively based on the control information from the compression rate controller 300.

As described above, an image transmission system according to the present invention is arranged such that when each of a plurality of image signals is transformed into compressed image data compressed at an image compressing portion, the image data are assembled to cells at a cell assembly portion, and the cells from the cell assembly portion are switched at a switching portion, a band controller controls the cell assembly portion so that a band of a transmission line has a value lower than a total band required for a simultaneous transmission of each of the image data, so that the transmission band can be used effectively.

Also, providing a network controller for controlling band controllers or compression rate controllers at each of communication nodes on a network enables supervising the band application status in the entire network.

Moreover, providing a sensor which detects a change of an event to control the band controller or the compression rate controller enables the band of the transmission line to be used in accordance with the real-time changes of the situations, thereby maintaining an appropriate quality of image.

What we claim is:

1. An image transmission system comprising;
   an image compressing portion for digitizing each of a plurality of image signals and further transforming the same into compressed image data,
   a cell assembly portion for assembling the image data to cells,
   a switching portion for switching the cells from the cell assembly portion, and
   a band controller for controlling the cell assembly portion so that a band of a transmission line has a value lower than a total band required for a simultaneous transmission of each of the image data.

2. The image transmission system as claimed in claim 1 wherein the band controller divides the image signals into groups and controls the cell assembly portion in a time division manner for at least one of the groups.

3. The image transmission system as claimed in claim 1 further comprising a network controller for controlling the band controller through a network.

4. The image transmission system as claimed in claim 1 further comprising a sensor for detecting a change of an event to control the band controller.

5. The image transmission system as claimed in claim 1 wherein the band controller controls a compression rate of the image compressing portion.

6. An image transmission system comprising;
   an image compressing portion for digitizing each of a plurality of image signals and further transforming the same into compressed image data,
   a cell assembly portion for assembling the image data into cells,
   a switching portion for switching the cells from the cell assembly portion, and
   a compression rate controller for controlling a compression rate of the image compressing portion so that a band of a transmission line has a value lower than a total band required for a simultaneous transmission of each of the image data.

7. The image transmission system as claimed in claim 6 further comprising a network controller for controlling the compression rate controller through a network.

8. The image transmission system as claimed in claim 6 further comprising a sensor for detecting a change of an event to control the compression rate controller.

9. The image transmission system as claimed in claim 3 wherein the network controller includes control information in an overhead portion of an ATM cell which flows through the network.

10. The image transmission system as claimed in claim 7 wherein the network controller includes control information in an overhead portion of an ATM cell which flows through the network.

11. The image transmission system as claimed in claim 3 wherein the network controller includes control information in a payload portion of an ATM cell which flows through the network.

12. The image transmission system as claimed in claim 7 wherein the network controller includes control information in a payload portion of an ATM cell which flows through the network.

* * * * *